United States Patent [19]

Hartig

[11] 4,261,936

[45] Apr. 14, 1981

[54] JACKETED OPTICAL FILAMENTARY MATERIAL WITH THERMOPLASTIC CORE

[75] Inventor: Martval J. Hartig, Wilmington, Del.

[73] Assignee: E. I. Du Pont de Nemours and Company, Wilmington, Del.

[21] Appl. No.: 969,931

[22] Filed: Dec. 15, 1978

Related U.S. Application Data

[63] Continuation of Ser. No. 722,629, Sep. 13, 1976, abandoned.

[51] Int. Cl.$^3$ .............................................. B29F 3/10
[52] U.S. Cl. ..................................... 264/1.5; 264/174
[58] Field of Search ................... 264/1, 171, 174, 103; 350/96 WG, 96 R, 96 B, 96 BC, 96.23

[56] References Cited

U.S. PATENT DOCUMENTS

| | | | |
|---|---|---|---|
| 3,458,615 | 7/1969 | Bragaw et al. ........................ | 264/171 |
| 3,556,635 | 1/1971 | Schrenk et al. .................. | 350/96 BR |
| 3,646,186 | 2/1972 | Hager ..................................... | 264/174 |
| 3,742,107 | 6/1973 | Hawkins .................................. | 264/1 |
| 3,779,627 | 12/1973 | Pinnow et al. ................. | 350/96 WG |
| 3,883,218 | 5/1975 | Slaughter ......................... | 350/96 BR |
| 4,093,342 | 6/1978 | Foord ............................... | 350/96.23 |

FOREIGN PATENT DOCUMENTS

| | | | |
|---|---|---|---|
| 2456069 | 5/1976 | Fed. Rep. of Germany ...... | 350/96 BR |
| 2556786 | 7/1976 | Fed. Rep. of Germany ...... | 350/96 BR |
| 2291508 | 7/1976 | France ................................. | 350/96 BR |
| 1037498 | 7/1966 | United Kingdom ................. | 350/96 R |
| 1438074 | 6/1976 | United Kingdom ................ | 350/96 BR |

OTHER PUBLICATIONS

"Materials" in Optical Spectra, Jul. 1976, p. 30.

*Primary Examiner*—Jeffery R. Thurlow

[57] ABSTRACT

An optical filamentary material with a thermoplastic optically transparent core and a lower index of refraction sheath is spaced from a protective jacket by a heat shield which thermally protects the optical filamentary material during extrusion and application of a jacketing polymer.

4 Claims, No Drawings

JACKETED OPTICAL FILAMENTARY MATERIAL WITH THERMOPLASTIC CORE

CROSS-REFERENCE TO RELATED APPLICATION

This application is a continuation of my prior copending U.S. application Ser. No. 722,629 filed Sept. 13, 1976, now abandoned.

BACKGROUND OF THE DISCLOSURE

The present invention relates to an optical filamentary material having a thermoplastic protective jacket and, more particularly, an optical filamentary material containing a core made from an optically transparent thermoplastic polymeric material.

Optical filamentary materials are well known in the art for transmission of light along a filament length by multiple internal reflections of light. Great care is taken to minimize light losses along the length of the filament or, in other words, internal reflections are made as total as possible so that light applied to one end of the optical filamentary material is efficiently transmitted to the opposite end of the material. The light transmitting portion or core of the optical filamentary material is contained with a sheath having a lower index of refraction which minimizes the escape or absorption of light along the length of the filament. This sheath is normally transparent since an opaque sheath tends to absorb light. Also, the sheath is conventionally made from a substantially amorphous material to minimize light scattering and absorption.

Optical filamentary materials can be divided into two general classes dependent upon the type of optically transparent core material. A first class of core material is thermoplastic in nature while a second class is made from glass. The first class is generally superior both in toughness and in ease of making connections while the second class is generally superior in light transmission.

SUMMARY OF THE INVENTION

The present invention relates to a cable for transmission of light comprising
(a) a cylindrical core of a substantially amorphous optically transparent thermoplastic polymeric material,
(b) a substantially amorphous transparent polymeric sheath for (a) having an index of refraction at least 0.1% lower, and
(c) an extruded polymer jacket which is exterior of (a) and (b);
the improvement comprising
  (i) use in (a) of an optically transparent material having a second order transition temperature from 80° C. to 140° C.;
  (ii) employment of a heat shield between (b) and (c);
  (iii) use in (c) of a polymer extruded at a temperature at least equal to the second order transition temperature of the material used in (i).

DETAILED DESCRIPTION OF THE INVENTION

The types of substantially amorphous thermoplastic polymeric materials suitable for an optically transparent cylindrical core of the optical filamentary material was varied. "Optically transparent" as employed herein means a light transmission of at least 50% per 30 centimeters in a portion of the spectrum between 550 to 1100 nanometers. This degree of transmission need not extend over the entire spectrum.

The polymers employed for the core have a second order transition temperature, Tg, in a range from 80° C. to 140° C.

Representative core materials include acrylic and polystyrene homopolymers and copolymers including those disclosed in British Pat. No. 1,037,498 e.g., acrylic resins which include polyalkyl methacrylates and copolymers thereof containing at least 70 percent by weight of units derived from an alkyl methacrylate, where the alkyl groups contain from 1 to 6 carbon atoms, such as polymethyl methacrylate, polyethyl methacrylate, polypropyl methacrylate, polybutyl methacrylate, polyisobutyl methacrylate and polycyclohexyl methacrylate and interpolymers thereof. Copolymers of units derived from methyl methacrylate and up to 30 weight percent by weight of units derived from ethyl acrylate or methyl acrylate, and up to 15 weight percent by weight of units derived from 2-ethyl hexyl acrylate are examples of useful polymers. Polymethyl methacrylate and copolymers thereof containing at least 70 percent by weight polymethyl methacrylate are preferred because they are readily available in high quality at a moderate cost and are very transparent. Also useful are those optically transparent polymers in which deuterium atoms have at least been partially substituted for hydrogen atoms. Suitable resins for core materials are also disclosed in U.S. Pat. No. 3,556,635 and U.S. Pat. No. 3,779,627.

The diameter of the cylindrical optically transparent core varies from relatively thin to relatively thick core constructions. A suitable diameter range is 0.1 to 2 mm. Thicker core constructions can also be used but tend to introduce undesirable bulkiness. Also, attenuation tends to increase with undue thick cores. A relatively thick core has the advantage in the ability to capture a greater proportion of incident light if the light source is large, e.g., from a LED (light emitting diode). However, if a light source is small, e.g., a laser, a relatively thin core is preferred in capturing incident light.

The sheath material for application to the optically transparent core is substantially amorphous and transparent with an index of refraction at least 0.1% lower than the core material. These properties of the sheath reduce scattering of light which would otherwise result in an increase of attenuation of transmitted light. Examples of suitable sheath materials include those disclosed in British Pat. Specification No. 1,037,498 such as polymers and interpolymers of vinyl fluoride, vinylidene fluoride, tetrafluoroethylene, hexafluoropropylene, trifluoromethyltrifluorovinyl ether, perfluoropropyltrifluorovinyl ether and fluorinated esters of acrylic or methacrylic acids having the structure

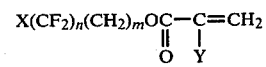

wherein X is selected from the group consisting of F, H, or Cl, and n is an integer of from 2 to 10, m is an integer from 1 to 6 and Y is either $CH_3$ or H.

Since the sheath material reflects light traveling through the core, the thickness of the sheath is not generally critical. Normally, a thickness of at least two times the wavelength of light travelling through the core is employed. An example of a suitable range of thickness of the sheath is 2 to 500 microns. Excessive sheathing thicknesses can reduce flexibility of the final cable.

Formation of the optical filamentary material of the core and its sheath is generally by coextrusion techniques which are well know in the art such as disclosed in U.S. Pat. Nos. 3,458,615 and 3,646,186.

The optical filamentary material with its optically transparent core and lower index of refraction sheath is protected by a jacket since in handling and in many uses damage to the filamentary material could otherwise occur. Such damage either results in an increase of attenuation of transmitted light or, even worse, breakage in the optical filamentary material.

In the present invention the jacket comprises a polymer which is applied by extrusion at a temperature at least equal to the second order transition temperature of the core material. The application of such polymer directly to the optical filamentary material of the optically transparent core and lower index of refraction sheath has been found to increase attenuation of light transmitted through the core. The extrusion temperature necessary to apply the polymer produces a detrimental effect on the ability of optical filamentary material to transmit light.

To overcome this effect of heat, it is required in the present invention to employ a heat shield which thermally protects the filamentary material during extrusion of the jacketing polymer. The heat shield comprises a material which can be applied to the optical filamentary material without application of excessive heat (i.e., at a temperature below the Tg of the core) and is capable of remaining a solid at the extrusion temperature of the jacketing polymer. Preferably, the heat shield is applied as a preformed material which means it is a solid prior to, during, and after its application to the optical filamentary material.

The preformed material can be shaped at the time of its application to the optic fiber material, e.g., by weaving fibers around the sheath. Alternatively a tube can be positioned around the optically transparent filamentary material. The thickness of the preformed material is sufficient to protect the thermoplastic optically transparent core from excessive heat when the jacketing polymer is applied until the jacketing polymer has been cooled externally.

Suitable materials of construction to form the heat shield polyesters, polyamides including aramids, polyolefins (homopolymers and copolymers), acrylics and cellulosic materials. Examples are nylon, wool, cotton, polyethylene and polypropylene. Considerations which govern the choice of material employed in the heat shield include the degree of protection from heat to be imparted from a thickness of shielding, and desired characteristics in the final cable including strength, elongation, burning characteristics, and ease of stripping.

It is understood that the heat shield need not contact the sheath (or an outer jacket layer). The heat shield can be bonded to the sheath by use of adhesive.

A jacket applied by extrusion at a temperature at least equal to the second order transition temperature of the thermoplastic core is positioned exterior of the heat shield. Since the primary purpose of a jacketing polymer is to protect the optical filamentary material, the governing factor in the choice of a suitable polymer is an ability of a polymer to be applied by an extrusion technique (at an elevated temperature at least equal to the Tg of the core). Extrusion techniques for application of such polymers are conventional and well known in the art. Suitable polymers for the jacket include polyamides, polyurethanes, copolyetheresters, polycarbonates, polyolefins (homopolymers and copolymers including ionomers) such as polyethylene and polypropylene and melt extrudable fluorocarbons such as tetrafluoroethylene/hexafluoropropylene copolymers.

Further considerations which govern the choice of jacketing polymers are properties desired in the final cable. These considerations include those in selection of the material for the heat shield such as strength, elongation, burning rate and ease of strippability. For example, good strippability is needed for ease in connecting one cable to another and in connecting a cable to a light source or detector.

It is within the scope of the present invention that more than one jacket be applied exterior of the heat shield. For purposes of illustration, a first jacketing polymer with a relatively low extrusion temperature could be applied to the heat shield followed by application of a second jacketing polymer at a relatively high extrusion temperature. In such case, the first jacketing polymer would aid in providing thermal protection for the optical filamentary material while the second polymer is extruded.

To further illustrate the present invention, the following examples are provided.

EXAMPLE 1

Part A

A starting optical filamentary material of a core of polymethyl methacrylate and a lower refractive index substantially amorphous transparent polymeric sheath of methyl methacrylate and fluorinated esters of methacrylic acid (Tg of 50° C. and refractive index 6% lower than core) was employed. The attenuation of this optical filamentary material was 490 dB per kilometer at 655.3 nm.

A 2.5 cm extruder was set up with a crosshead tubing type die equipped with a guide 1.05 mm ID, 2.32 mm OD and a 3.75 mm die. Six yarn tensioners were equally spaced around a 7 cm circle above the guide opening and were strung with a 22 tex (195 denier) zero twist yarn of fibers of poly(p-phenylene terephthalamide). The yarns were strung through a stainless steel needle 1.2 mm ID and 1.62 mm OD. This needle was put into the entrance of the guide and the yarns pulled through the hole in the guide through a water quench tank to a variable speed puller.

The extruder was heated to 175° C. and an ionic copolymer of ethylene and 15 weight % methacrylic acid having 20% of carboxylic acid groups neutralized by zinc ions (Melt flow index 14, ASTM D-1238, 190° C., 2.60 gm, Condition E) was introduced into an extruder at low speed. When this ionic copolymer appeared at the extruder outlet, the puller was started. The die was adjusted to center the yarns interior of the ionic copolymer being extruded as a tube. Takeoff speed was raised to 58 meters/minute and the extruder speed adjusted to give a tube about 0.9 mm OD. At this time the melt temperature was at 160° C. Into the needle the optical filamentary material encircled by the fibers of poly(p-phenylene terephthalamide) was fed and incorporated into the center of the ionic copolymer tube.

This material had an attenuation of 500 dB per kilometer at 655.3 nm.

Part B

The material of Part A was overcoated with copolyetherester (disclosed in Example 1 of U.S. Pat. No. 3,651,014) by extrusion employing a melt temperature of 185° C. The cable had an outer diameter of about 1.25 mm. The attenuation was 490 dB per kilometer at 655.3 nm.

CONTROL FOR EXAMPLE 1

The procedure of Example 1 Part A was followed except a yarn of fibers of poly(p-phenylene terephthalamide) was not employed.

The attenuation of this product was 1800 dB per kilometer at 655.3 nm.

EXAMPLE 2

The procedure of Example 1 Part A was followed including application of the ionic copolymer disclosed in Example 1 except in place of the fibers poly(p-phenylene terephthalamide) three 155 tex (1400 denier) Dacron ® polyester were used.

The attenuation of this product was 600 dB per kilometer at 655.3 nm.

What is claimed is:

1. Method for reducing the detrimental effect on the ability to transmit light of polymeric optical filamentary material during manufacture of a cable for transmission of light from said optical filamentary material, said material comprising
   (a) a cylindrical core of a substantially amorphous optically transparent thermoplastic polymeric material having a second order transition temperature from 80° C. to 140° C.; and
   (b) a substantially amorphous transparent polymeric sheath for (a) having an index of refraction at least 0.1% lower than that of (a), wherein a polymer jacket which is exterior to (a) and (b) is extruded at a temperature at least equal to the second order transition temperature of (a), said method comprising placing a heat shield over said optical filamentary material before said jacket is extruded over said material.

2. The method of claim 1 wherein said heat shield is a solid prior to, during, and after its application to (a) and (b).

3. The method of claim 2 wherein said heat shield comprises yarns of fibers of poly(p-phenylene terephthalamide).

4. The method of claim 1 wherein said polymer jacket is of a second jacketing polymer which is extruded at a relatively higher extrusion temperature over said heat shield which comprises a first jacketing polymer having a relatively lower extrusion temperature.

* * * * *